United States Patent
Metwalli et al.

(10) Patent No.: US 12,206,656 B2
(45) Date of Patent: Jan. 21, 2025

(54) METHOD AND APPARATUS WITH PROVIDER INFORMATION ACCESS AUTHORIZATION

(71) Applicant: The Toronto-Dominion Bank, Toronto (CA)

(72) Inventors: Ashraf Magdi Metwalli, Toronto (CA); Ashleigh Anne Mansfield Blain, London (CA); Mahendra Chhotubhai Rawal, London (CA); Joseph Matthew Capern, Toronto (CA); Xiang Shen, Mississauga (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 17/941,670

(22) Filed: Sep. 9, 2022

(65) Prior Publication Data
US 2023/0006992 A1 Jan. 5, 2023

Related U.S. Application Data

(63) Continuation of application No. 16/839,191, filed on Apr. 3, 2020, now Pat. No. 11,470,073.

(51) Int. Cl.
*H04L 9/40* (2022.01)
*G06F 21/62* (2013.01)
(Continued)

(52) U.S. Cl.
CPC .......... *H04L 63/0815* (2013.01); *G06F 21/62* (2013.01); *G06Q 20/385* (2013.01); *G06Q 20/40145* (2013.01); *H04L 63/0272* (2013.01)

(58) Field of Classification Search
CPC ............ H04L 63/0815; H04L 63/0272; G06Q 20/385; G06Q 20/40145; G06F 21/62
See application file for complete search history.

(56) References Cited

U.S. PATENT DOCUMENTS

| | | | |
|---|---|---|---|
| 8,522,039 B2 | 8/2013 | Hyndman et al. | |
| 2003/0061512 A1* | 3/2003 | Flurry | H04L 63/0815 726/4 |

(Continued)

FOREIGN PATENT DOCUMENTS

| | | |
|---|---|---|
| KR | 20020046561 A1 | 6/2002 |
| KR | 100869132 B1 | 11/2008 |
| TW | M556375 | 3/2018 |

*Primary Examiner* — Hee K Song
(74) *Attorney, Agent, or Firm* — NIXON PEABODY LLP

(57) ABSTRACT

A method and apparatus with provider information access authorization are provided. The method includes receiving a single sign-on (SSO) token from a provider apparatus for a validated login request by a client device for a user account, wherein the SSO token is indicative of the provider apparatus having authorized secure protocol access with the provider apparatus to access information at the provider apparatus associated with the user account, retrieving customer information from the provider apparatus using the SSO token, receiving information from the client device, confirming whether, based on the information and the customer information that a user of the user account is eligible to complete a data exchange, and in response to a result of the confirming being that the user of the user account is confirmed eligible to compete the data exchange, cause the provider apparatus to process the data exchange corresponding to the information.

19 Claims, 11 Drawing Sheets

(51) Int. Cl.
    *G06Q 20/38*        (2012.01)
    *G06Q 20/40*        (2012.01)

(56) References Cited

U.S. PATENT DOCUMENTS

| | | | |
|---|---|---|---|
| 2012/0023556 A1* | 1/2012 | Schultz | G06F 21/41 |
| | | | 726/8 |
| 2016/0021097 A1* | 1/2016 | Shrotri | H04L 63/0815 |
| | | | 726/8 |
| 2018/0336538 A1 | 11/2018 | Cantley et al. | |
| 2018/0376378 A1* | 12/2018 | Greene | G06Q 20/3265 |

\* cited by examiner

METHOD AND APPARATUS WITH PROVIDER INFORMATION ACCESS AUTHORIZATION

CROSS-REFERENCE TO RELATED APPLICATION

This application is a continuation of, and claims the benefit of priority to, U.S. application Ser. No. 16/839,191, filed Apr. 3, 2020, the disclosure of which is expressly incorporated herein by reference to its entirety.

FIELD

The present application generally relates to a method and apparatus with provider information access authorization.

BACKGROUND

In a typical information sharing system, there may be a management apparatus and a separate provider apparatus. However, the management apparatus and the provider apparatus may use separate and distinct/independent authentication processes, for example, separate usernames, passwords, multi-factor authentication, biometric authentication, and so on.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an apparatus includes one or more processors, and a memory storing instructions that, when executed by the one or more processors, configure the one or more processors to receive a single sign-on (SSO) token from a provider apparatus for a validated login request by a client device for a user account, wherein the SSO token is indicative of the provider apparatus having authorized, to the one or more processors, secure protocol access with the provider apparatus to access information at the provider apparatus associated with the user account, retrieve customer information from the provider apparatus using the SSO token, receive information from the client device, confirm whether, based on the information and the customer information, that a user of the user account is eligible to complete a data exchange, and in response to a result of the confirming being that the user of the user account is confirmed eligible to complete the data exchange, cause the provider apparatus to process the data exchange corresponding to the information.

The SSO token may include a valet token that permits access to only some information at the provider apparatus associated with the user account used for the data exchange.

The authorizing having been performed, as indicated by the received SSO token, may be based on the apparatus sending an SSO identification request to an identity provider associated with the provider apparatus with the login request.

The provider apparatus may be a separate entity from the apparatus, the apparatus and the provider apparatus may share information through a VPN, and the VPN may provide the SSO token to the provider apparatus when accessing information for the apparatus from the provider apparatus.

The data exchange may be a purchase transaction.

For the confirming, the one or more processors may be configured to use at least one of the customer information and the information from the provider apparatus to verify at least one of that the user is legally permitted to purchase products included in the purchase transaction, that the user has sufficient funds to purchase products of the purchase transaction, that the user is located at a suitable location to receive products of the purchase transaction, that the user has consented to suitable terms to receive products of the purchase transaction, that sufficient quantities of product are available to fulfill the products of the purchase transaction, and/or that there is no flag or indicator associated with the user providing that it is not appropriate to fulfill the products of the purchase transaction.

The apparatus may include a transaction apparatus that provides for sale products including precious metals products, and the transaction apparatus may communicate through a communication network with third parties to provide support tasks including at least one of delivering the precious metals products, performing credit card purchase processing, accessing precious metals pricing, and performing delivery address validation, and the transaction apparatus uses the SSO token to retrieve information from the provider apparatus for use by the third parties for the support tasks.

The apparatus may include a transaction management system that includes a transaction apparatus that includes the one or more processors and the memory, and the transaction management system may further include the provider apparatus, the provider apparatus including respective one or more processors that are configured, through execution of corresponding instructions stored in a corresponding memory of the transaction management system, to perform the validating of the login request as received by the provider apparatus and a generating of the SSO in response to a result of the performed validating being a successful validation, and provide the customer information to the transaction apparatus in response to receipt of the SSO token from the transaction apparatus.

In another general aspect, a processor-implemented method performed by a transaction management apparatus includes receiving a single sign-on (SSO) token from a provider apparatus for a validated login request by a client device for a user account, wherein the SSO token is indicative of the provider apparatus having authorized secure protocol access with the provider apparatus to access information at the provider apparatus associated with the user account, retrieving customer information from the provider apparatus using the SSO token, receiving information from the client device, confirming whether, based on the information and the customer information that a user of the user account is eligible to complete a data exchange, and in response to a result of the confirming being that the user of the user account is confirmed eligible to compete the data exchange, cause the provider apparatus to process the data exchange corresponding to the information.

The SSO token may include a valet token that permits access to only some information at the provider apparatus associated with the user account used for the data exchange.

The authorizing having been performed, as indicated by the received SSO token, may be based on sending an SSO identification request to an identity provider associated with the provider apparatus with the login request.

The provider apparatus may be a separate entity from the transaction management apparatus, the transaction management apparatus and the provider apparatus may share information through a VPN, and the VPN may provide the SSO token to the provider apparatus when accessing information from the provider apparatus.

The data exchange may include a purchase transaction.

The confirming may include using at least one of the customer information and the information from the provider apparatus to verify at least one of that the user is legally permitted to purchase products of the purchase transaction, that the user has sufficient funds to purchase products of the purchase transaction, that the user is located at a suitable location to receive products of the purchase transaction, that the user has consented to suitable terms to receive products of the purchase transaction, that sufficient quantities of product are available to fulfill the products of the purchase transaction, and/or that there is no flag or indicator associated with the user providing that it is not appropriate to fulfill the products of the purchase transaction.

The transaction management apparatus may include a transaction apparatus, and the transaction apparatus may provide for sale products including precious metals products, and the transaction apparatus may communicate through a communication network with third parties to provide support tasks including at least one of delivering the precious metals products, performing credit card purchase processing, accessing precious metals pricing, and performing delivery address validation, and the transaction apparatus uses the SSO token to retrieve information from the provider apparatus for use by the third parties for the support tasks.

In another general aspect, a provider apparatus includes one or more processors, and a memory storing instructions that, when executed by the one or more processors, configure the one or more processors to receive a login request from a transaction management apparatus, wherein the login request includes login credentials for a user account, validate the login request, and in response to the validation of the login request being successful, generate a single sign-on (SSO) token to authorize the user account to have authorized secure protocol access, to information at the provider apparatus associated with the user account, provide the SSO token to the transaction management apparatus, and provide customer information, to the transaction management apparatus by the provider apparatus, corresponding to a user of the user account, in response to receipt of the SSO token from the transaction management apparatus, the customer information being used by the transaction management apparatus for determining whether the user is eligible to complete a data exchange.

The data exchange may include a purchase transaction, and the one or more processors may be further configured to, in response to a result of the determining being that the user is determined eligible to complete the purchase transaction, process a purchase corresponding to the purchase transaction by transferring funds associated with the user account in payment for goods associated with the purchase and by initiating a delivery process to provide the user of the user account with the goods.

The customer information may be stored in a provider data repository accessed by the provider apparatus, and the provider data repository may also store information about financial accounts associated with the user account that may be used for payment and valid login credentials associated with the user account that may be used to validate the login request.

The validating having been performed, as indicated by the provided SSO token, may be based on the transaction management apparatus sending an SSO identification request to an identity provider associated with the provider apparatus with the login credentials, and may be based on the transaction management apparatus receiving an SSO identification response from the identity provider associated with the provider apparatus, including the SSO token.

The provider apparatus may be a separate entity than the transaction management apparatus, the transaction management apparatus and the provider apparatus may share information through a VPN, and the VPN may provide the SSO token to the provider apparatus when accessing information from the provider apparatus.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
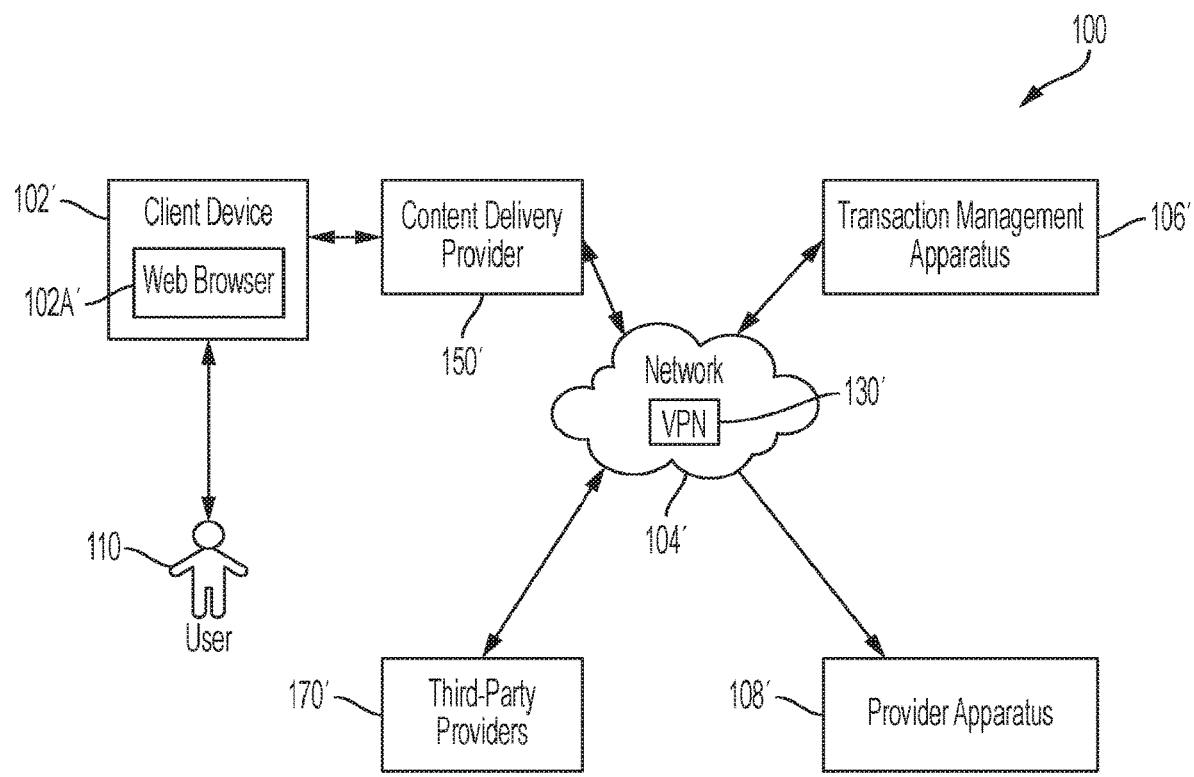
FIG. 1 is a schematic diagram illustrating a typical transaction management system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

Other aspects and features of the present application will be understood by those of ordinary skill in the art from a review of the following description of examples in conjunction with the accompanying figures.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of" is intended to cover any one or more of the listed elements, including any one of the listed elements alone, any sub-combination of each of some of the listed elements less than all of the listed elements, or all of the listed elements, without necessarily excluding any additional respective elements of the listed elements, and without necessarily requiring all of the listed elements.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. Herein, it is noted that use of the term "may" with respect to an example or embodiment, e.g., as to what an example or embodiment may include or implement, means that at least one example or embodiment exists where such a feature is included or implemented while all examples and embodiments are not limited thereto.

Typical transaction sites (or websites) that are operated by transaction entities and operate in the context of selling products for a first entity, which has its own first entity site (or website), may be somewhat limited in that transactions must be paid for by credit cards, and there may be caps on transaction amounts such as because of a difference in a level of trust between the user and the transaction site and a level of trust between the user and the first entity site, as well as the lack of trust between the user authenticated by the transaction site and that transaction site's access to information of the user available to the first entity. For example, this typical transaction site is hosted using a separate domain from that of the first entity, a separate authentication including authentication credentials, for example, username and password, and so on, are also utilized uniquely for the transaction site, in that the transaction site has no way to exploit or utilize data that is available based on the fact that a user may have already been authenticated by the first entity site or the dedicated mobile app or PC application, and the first entity may have specialized information because of a preexisting relationship with the user.

Thus, typical approaches may be limited in that while a first entity may have access to several kinds of customer information, a typical transaction management apparatus (or transaction apparatus) may have a limited ability to communicate with the provider apparatus for the first entity in a way that would let the transaction management apparatus take maximum advantage of the customer information and/or other account information of an existing trusted customer of the first entity.

FIG. 1 is a schematic diagram illustrating a typical transaction management system.

At present, a typical transaction management system 100 may provide an existing precious metals transaction infrastructure that provides certain capabilities. A user 110 may interact with the existing precious metals infrastructure to purchase precious metals online, such as through a client device 102', using a web browser 102A'. A content delivery provider 150' connects the customer to a transaction management apparatus 106', which hosts a transaction site, such as a transaction site dedicated to the purchase of precious metals. The transaction management apparatus 106' may also derive information from the financial institution, such as by communicating with provider apparatus 108' that acts as a backend for the financial institution, and from third-party providers 170'. The information interchange between content delivery provider 150', transaction management apparatus 106', provider apparatus 108', and third-party providers 170' may take place through network 104' using the Internet.

For example, as discussed below in greater detail, the transaction site hosted by the transaction management apparatus 106' may interact with third-party providers 170' for certain services, such as for price data, secure transport of precious metals, online credit card processing, and shipping and addressing.

In a typical transaction management system 100 involving a financial entity, the only interactions between the transaction site hosted by the transaction management apparatus 106' and the provider apparatus 108' of the financial entity may be, first, a secure https connection between the transaction site and a Branch Locator API for the financial entity that can help coordinate pickup of the precious metals once they are sold, and second, by interaction, using a VPN for security, for sales transactions by the financial entity, as managed by Back Office Users of the financial entity, who have special access privileges because they work for the financial entity.

The example of FIG. 1 illustrates a number of issues present in the typical infrastructure. Primarily, because there is limited authentication of a user 110 who interacts with the transaction management apparatus 106' with respect to providing access to the provider apparatus 108', even for known customers of the financial institution, who could may be authenticated more easily, the privileges of the user 110 at the transaction management apparatus 106' are curtailed and/or restricted to manage security risks and the user 110 is limited in his or her options. One or more embodiments herein provide for a system architecture that may address such issues and may otherwise extend and improve the transaction process over previous technologies.

Figure 2:
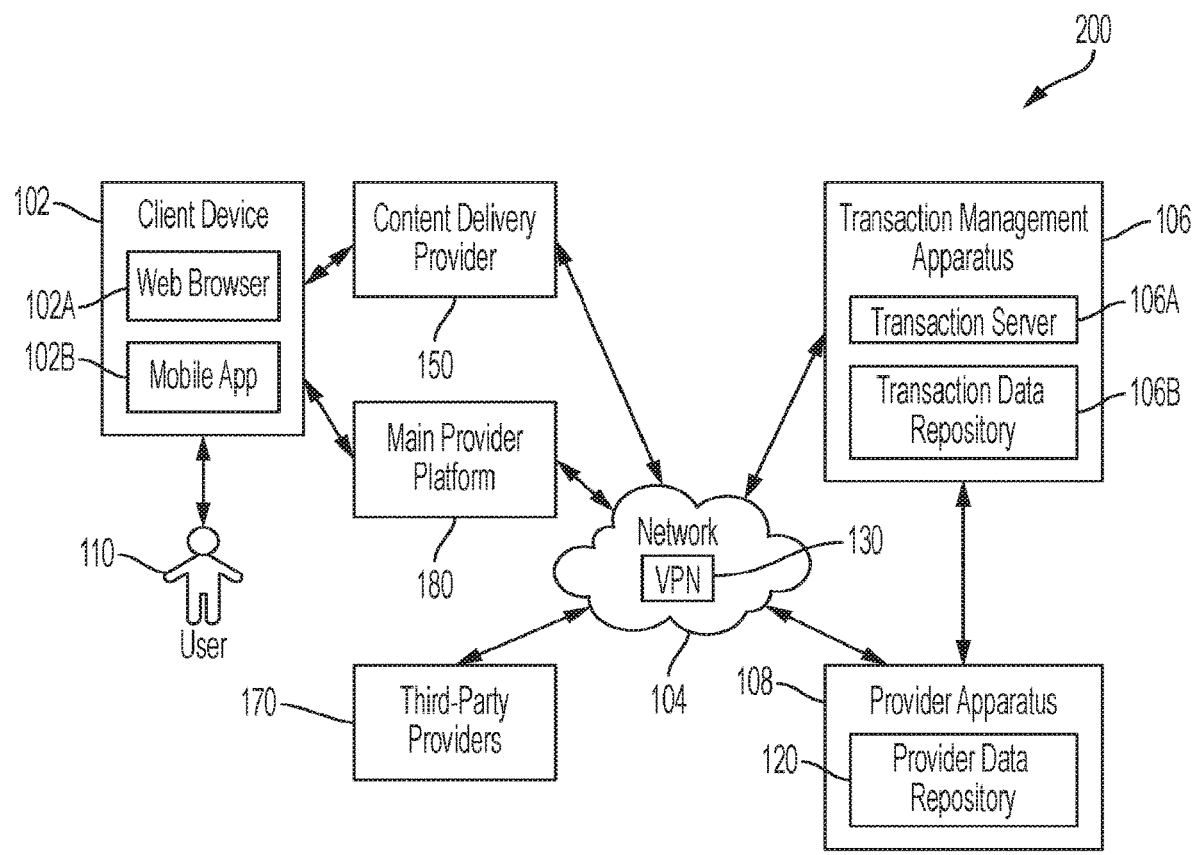
FIG. 2 is a schematic diagram illustrating a transaction management system, according to one or more embodiments.

FIG. 2 is a schematic diagram illustrating a transaction management system, according to one or more embodiments.

Thus, FIG. 2 is a diagram illustrating an example transaction management system 200 consistent with examples that provide for interactions between elements included in a transaction system. In one or more examples, the transaction management system 200 may include client device 102, network 104, transaction management apparatus 106, provider apparatus 108, provider data repository 120, virtual private network (VPN) 130, content delivery provider 150, and third-party providers 170. While similar reference numbering may be demonstrated between FIGS. 1 and 2 this is not done in an attempt to infer that any components, processes, or functionalities are the same between FIGS. 1 and 2.

In an example, a user 110 interacts with the client device 102 in an attempt to complete purchase transactions over network 104, such as of precious metals, but the transaction management system 200 is not limited to a use by a single user 110 and may also involve goods other than precious metals. Also, in one or more examples, the user 110 may interact with transaction management apparatus 106 in additional or alternate ways, e.g., in that examples include the user 110 interacting directly with transaction management apparatus 106, and examples include the client device 102 interacting with transaction management apparatus 106 without an intervening network 104.

In an example, client device 102 may be a computing device, i.e., having one or more processors, such as, but not limited to, a personal computer, a laptop computer, a tablet computer, a notebook computer, a hand-held computer, a personal digital assistant, a portable navigation device, a mobile phone, a smart phone, a wearable computing device, for example, a smart watch, a wearable activity monitor, wearable smart jewelry, and glasses and other optical devices that include optical head-mounted displays (OHMDs), an embedded computing device, for example, in communication with a smart textile or electronic fabric, and any other type of computing device that may be configured to store data and instructions, e.g., computer or processor executable instructions, and execute the instructions to perform one or more methods, operations, and examples described below and consistent therewith. In one or more examples the computing device may be further configured to store and/or display information on a display device(s), consistent with disclosed examples. In one or more examples, client device 102 may be associated with one or more users, such as user 110. For instance, user 110 may operate client device 102 and may do so to cause client device 102 to perform one or more methods or operations consistent with the disclosed examples. Network 104 may also connect transaction management apparatus 106 and provider apparatus 108 with one another and with client device 102, providing client device 102 an interface for user 110 that provides user 110 interaction with the transaction management apparatus 106, so that the transaction management apparatus 106 may act to provide the functionality of a transaction site to user 110.

Client device 102 may include one or more tangible, non-transitory memories that store data and/or instructions, and one or more processors configured to perform one or more methods, operations, and examples described below, or examples consistent therewith, through execution of the instructions. Client device 102 may also include one or more display devices that display information to a user and one or more input device(s) to provide the user to capability to input information to client device 102, for example, a keypad, a keyboard, a touchscreen, a mouse, voice activated control technologies, or any other type of known input device.

In one or more examples, client device 102 may store in memory one or more software applications that run on client device 102 and are executed by the one or more processors. In one or more examples, client device 102 may store software applications that, when executed by the one or more processors, perform operations that provide user 110, through client device 102, the capability to interact with provider apparatus 108 and provider data repository 120 through, for example, another computing device, such as transaction management apparatus 106. In one or more examples, additional software applications may, when executed by client device 102, cause client device 102 to send information to be stored in a memory remote to client device 102 and/or receive information stored in a memory remote to client device 102, for example, a memory associated with transaction management apparatus 106 or provider apparatus 108, such as provider data repository 120.

For example, client device 102 may provide the user 110 use a web browser 102A or a mobile app 102B. For example, these programs may provide access to transaction management apparatus 106 through a content delivery provider 150, as in the example of FIG. 1. However, the web browser 102A or the mobile app 102B may also provide access to a main provider platform 180 for a financial institution. Such a main provider platform 180 may be a central site for the financial institution, accessed through the web browser 102A. Alternatively, the mobile app 102B may provide direct access to the main provider platform 180. Regardless of how the access is established to the main provider platform 180, an example aspect of such access is that by using the web browser 102A or the mobile app 102B to access the main provider platform 180, the user 110 authenticates themselves with the main provider platform 180, which subsequently provides the user 110 with a facilitated experience when accessing the transaction management apparatus 106, because if the transaction management apparatus 106 is accessed by an authenticated user 110 using main provider platform 180, an SSO can occur, making login easier and granting certain access privileges to the provider apparatus 108 for the transaction management apparatus 106.

In an example, additional or alternative software applications may, when executed by client device 102, cause client device 102 to establish communications with transaction management apparatus 106 or provider apparatus 108, for example, through a corresponding application programming interface (API), a site, or a mobile app, and facilitate user 110's interaction with the transaction management apparatus 106, while drawing on information from provider apparatus 108 and provider data repository 120. The examples are, however, not limited to such enumerated examples, and further examples include the client device 102 being configured in any additional or alternate manner to provide communication and data exchange with transaction management apparatus 106, which may be across network 104.

Transaction management apparatus 106 may be a computing system configured to perform one or more methods, operations, and examples described below, or examples consistent therewith, through execution of the instructions, as discussed in greater detail, below. In one or more examples, transaction management apparatus 106 may be associated with a first entity, for example, a financial institution or a bank that provides financial accounts, financial services transactions, and investment services for one or more users, for example, customers of the first entity. For example, the first entity may be a financial institution or a bank that sells precious metals products, such as coins or bars of gold, silver, and so on. While the transaction management apparatus 106 of FIG. 2 may be representative of an apparatus that is implemented by a single computer, FIG. 2 is also representative of the transaction management apparatus 106 being a distributed system that may include computing components distributed across one or more networks, such as network 104, or other networks, such as the Internet or a local area network (LAN).

Thus, in one or more examples, transaction management apparatus 106 may include computing components configured to store, maintain, and generate data and instructions. For example, transaction management apparatus 106 may include one or more servers, for example, transaction server 106A, and tangible, non-transitory memory devices, for example, transaction data repository 106B. Transaction server 106A may include one or more computing devices that may be configured, based on execution of instructions, to perform one or more methods or operations consistent with the disclosed examples. In one or more examples, transaction server 106A may be a computing device that executes instructions that perform operations that provide information to one or more other components of the example transaction management system 200.

In one or more examples, transaction server 106A may include a computer, for example, a server, personal computer, network computer, or mainframe computer, having one or more processors that may be selectively activated or reconfigured by a computer program. In one or more examples, transaction server 106A, or other computing components of transaction management apparatus 106, may be configured to provide one or more sites, digital portals, transaction interfaces, and so on, that provide services consistent for the first entity, such as a digital banking or investment portal, and services consistent with disclosed examples, such as the purchase of precious metals products. For instance, transaction server 106A may be configured to provide information associated with a requested web page over network 104 to client device 102, such that client device 102 may render the received information and present content from the web page on a display device, for example, a touchscreen display unit of a smartphone, where the client device 102 is a smartphone, as a non-limiting example. For example, client device 102 may use web browser 102A to display such a web page. Alternatively, as another non-limiting example, information form the transaction server 106A may be provided in a mobile app 102B for user access by client device 102, rather than a web browser 102A.

In one or more examples, transaction server 106A, or other computing components of transaction management apparatus 106, may be configured to provide information to one or more application programs executed by client device 102, such as through a corresponding application programming interface (API). For example, client device 102 may execute an application program associated with and provided by the first entity, such as a mobile banking and/or investment application, to provide services to user 110 consistent with the examples. As discussed in greater detail, below, such an application may be able to cause the transaction management apparatus 106 to interact with the provider apparatus 108 to facilitate the performance of the services, such as by retrieving customer information or transferring funds as payment for transactions.

In one or more examples, transaction server 106A may provide information to client device 102, for example, through the API associated with the executed application program, and client device 102 may be configured by the executed application program to present portions of the information to user 110 through a corresponding graphical user interface (GUI). Examples of such interaction are using a site or a mobile app as discussed above, but the API may be used by a dedicated application or by other computer programs to facilitate transactions.

In one or more examples, transaction server 106A, or other computing components of transaction management apparatus 106, may be configured to provide to client device 102, and/or receive from client device 102, information associated with services provided by the first entity, such as the purchase of precious metals. For example, client device 102 may receive the transmitted information, and store portions of the information in locally accessible storage device(s) and/or network-accessible storage devices and data repositories, for example, cloud-based storage or the transaction data repository 106B. Additionally, transaction server 106A may be incorporated as a corresponding node in a distributed network, and additionally or alternatively, as a corresponding networked server in a cloud-computing environment, though it is not required that transaction server 106A have a distributed nature. Furthermore, transaction server 106A may communicate using network 104 with one or more additional servers, where such additional servers may facilitate the distribution of processes and computation for parallel execution by the additional servers, which may lower the processing burden on server 142.

Provider data repository 120 may include one or more memories that are configured to store and provide access to data and/or instructions as described above. Such memories may include tangible non-transitory computer-readable media that store such instructions that, when executed by one or more processors, for example, of provider apparatus 108, configure the one or more processors to perform one or more methods or operations consistent with examples described herein. Provider data repository 120 may also be configured to store information relating to the first entity, such as a financial institution. For example, provider data repository 120 may be configured to store data identifying customers of the financial institution, financial account data associated with the customers, investment portfolio data associated with the customers, and data indicative of social-networking activity of the customers, as non-limiting examples. However, provider data repository 120 may also be configured to store other information associated with the customers, in other examples. Example aspects of storing and accessing such information are discussed in greater detail, below.

In one or more examples, provider data repository 120 may store customer data that uniquely identifies customers of a financial institution associated with provider apparatus 108. By way of example, a customer of the financial institution, for example, user 110, may access a web page associated with transaction management apparatus 106, for example, through a web server executed by a corresponding front end, and may register for digital banking services and provide data, which may be linked to user 110 and stored as customer data within provider data repository 120. As noted above, such access may include access through main provider platform 180. The stored customer data may, for example, include personal information, government-issued identifiers, employment information, and contact information. The customer data may also include authentication credentials associated with registered users of the financial institution, for example, a user name, a user-specified password, a system-generated password, an alphanumeric identification number, such as a PIN number, specified by user 110 or assigned by transaction management apparatus 106 and/or provider apparatus 108, and/or information facilitating enhanced authentication techniques.

Provider data repository 120 may also store account data identifying one or more accounts of users of the financial institution associated with provider apparatus 108. In one or more examples, account identification information may include information associated with a financial service account, such as, as non-limiting examples, a checking account, a savings account, a revolving credit line, an account linked to a credit or debit card, an investment account, a brokerage account, and any additional or alternate account provided or supported by the financial institution.

In one or more examples, provider data repository 120 may also store portfolio data that identifies investment portfolios held by customers of the financial institution. In one or more examples, the stored portfolio data may include information identifying a real or "actual" investment portfolio composed of actual financial positions held by a user in various securities, such as stocks, bonds, mutual funds, exchange-traded funds, as non-limiting examples. In one or more examples, the portfolio data may include information identifying one or more "virtual" investment portfolios composed of "simulated" positions held by user 110 in various securities. In one or more examples, provider data repository 120 may also store portfolio data identifying one or more "watch lists" that specify various securities monitored by user 110 and corresponding simulated positions held by user 110 in these various securities.

In one or more examples, the securities associated with user 110's actual investment portfolio, virtual investment portfolio, and watch list may represent various equity and debt securities. In one or more examples, equity and debt securities may include, but are not limited to, shares of common stock, corporate or governmental bonds, mutual funds, bond funds, preferred stock, debentures, warrants, options, exchange traded funds (ETFs), and any additional or alternate equity or debt security associated with a recognized and/or registered security identifier.

Further, portfolio data stored at provider data repository 120 may include information identifying the simulated or actual positions held by user 110 in these securities, as well as information identifying a schedule for providing electronic updates to user 110 regarding a performance of these securities. By way of example, the electronic updates may be provided by provider apparatus 108 to client device 102 in real-time or in near-real time. For instance, one or more of the near-real-time updates provided by provider apparatus 108 may include frequent and/or cached updates of real-time prices of the securities, which may be stale by a predefined time (every second, every 30 seconds, every minute, etc.). In other instances, provider apparatus 108 may be configured to provide one or more of the electronic updates to client device 102 at predetermined intervals (e.g., daily, weekly, monthly, quarterly, etc.) and/or in response to customer-specific events. Further, in one or more examples, provider apparatus 108 may delay the provision of one or more of the electronic updates to client device 102 by a predetermined time period (e.g., by fifteen or twenty minutes), and additionally or alternatively, provider apparatus 108 may provide one or more of the electronic updates to client device 102 at an end of a trading day on a corresponding market.

Provider data repository 120 may also store social networking data indicative of an interaction of customers of the financial institution with one or more social networks, such as TWITTER, FACEBOOK, FOURSQUARE, INSTAGRAM, TUMBLR, LINKEDIN, SNAPCHAT, and so on. For example, user 110 may be a regular user of TWITTER, and upon registration for digital banking services, user 110 may provide transaction management apparatus 106 with a corresponding TWITTER handle. Further, through a web page or other interface presented by client device 102, user 110 may grant transaction management apparatus 106 access to information associated with user 110's FACEBOOK and/or TWITTER accounts, which may include, but is not limited to providing transaction management apparatus 106 with corresponding authentication credentials, which include, but are not limited to user names and/or handles, and passwords.

In one or more examples, provider apparatus 108 may establish customer profile data for one of more of the customers of a first entity, for example, a financial institution, which provider apparatus 108 may store in provider data repository 120 and additionally or alternatively, in an external data repository accessible to provider apparatus 108 across network 104, for example, cloud-based storage. For example, provider apparatus 108 may establish a customer profile data file for user 110 that includes all or a portion of user 110's stored customer data, account data, portfolio data, and/or social networking data. In one or more examples, user 110 may access, update, and/or modify portions of the stored customer profile data through a web page or other graphical user interface (GUI) provided by provider apparatus 108 and rendered for presentation by client device 102, such as through web browser 102A or mobile app 102B. In one or more examples, provider apparatus 108 may execute software instruction that dynamically modify and/or update user 110's customer profile data based financial services transactions and other financial services initiated and/or executed by provider apparatus 108 on user 110's behalf.

In one or more examples, user 110's customer profile data may include information identifying one or more digital banking and investment services and programs associated with user 110 and/or user 110's accounts, for example, as held by the financial institution associated with provider apparatus 108. For example, user 110 may elect to authorize and/or consent to the examples of processes for automated execution of purchase of precious metals orders as described below, for example, based on input provided to a web page or other GUI presented by client device 102. In one or more examples, and in response to user 110's choice, provider apparatus 108 may update user 110's customer profile to include information indicative of user 110's decision to participate in the automated precious metals transaction processes.

In one or more examples, user 110's customer profile may also include information identifying one or more preferences and/or settings specified by user 110 for the digital banking and investment services and programs in which user 110 participates. By way of example, provider apparatus 108 may provide, to client device 102 for presentation for user 110, one or more selectable preferences and settings associated with the precious metals transaction processes. For example, provider apparatus 108 may enable user 110 to select, for example, through a web page or GUI provided by provider apparatus 108 and presented by client device 102 one or more user accounts that may be accessible to the automated precious metals transaction processes described in greater detail, below.

Further, through a web page or GUI provided by transaction management apparatus 106 and presented by client device 102, user 110 may specify that transaction management apparatus 106 should initiate execution of precious metals transactions. For example, user 110 may provide, as input to the web page or GUI presented by client device 102, information identifying one or more accounts that fund precious metals orders held by user 110. In one or more examples, transaction management apparatus 106 may store the user established default values, favorites, and mappings as preference data within transaction data repository 106B or may access such information by accessing provider data repository 120 at provider apparatus 108.

Thus, it may be possible to increase the flexibility and ease of use for a transaction management apparatus, such as a transaction management apparatus designed to interact with a provider apparatus for a financial entity, as a non-limiting example, by using customer information already held by the example financial entity, to establish the identity of the customer. The identity of the customer may be used to determine how much to trust the customer, which would then establish the customer's approval to have a right to buy, e.g., to buy metals. Identifying the customer could also give access to retrieving and/or modifying customer information, as needed to pay for such precious metals transactions. As a result, it would be safer to approve larger dollar or weight transactions and pay for the precious metals using various accounts managed by the example financial entity, because there would be an assurance of the user's identity and ability to safely pay for the precious metals transactions.

In order to implement various features, the examples designed to facilitate the interaction between the transaction management apparatus and the provider apparatus may provide different levels of access, where users gain additional privileges with respect to purchasing the precious metals as they establish their identities and the system associates them with an appropriate level of access. For example, the approach used by the client device to interact with the main provider platform, whether it be a banking site or a mobile app, may receive login credentials from a user, and then use these login credentials to derive a "Valet Ticket," which acts as a Single Sign-On (SSO) token that identifies the user in a unified, preapproved manner. The Valet Ticket may then be provided to the provider apparatus's information infrastructure so that the provider apparatus can perform a number of security transactions to provide certain authorizations to the transaction management apparatus, and then share information, either directly or through a VPN, as discussed in greater detail, below, in a manner that provides the transaction management apparatus with leverage information already held by the provider apparatus.

One or more examples include a system architecture with an transaction management apparatus and a related provider apparatus that lets a user establish his or her identity and then use that established identity to discover customer information from the provider apparatus that helps the transaction management apparatus provide an appropriate level of access and appropriate purchasing options for the user. The system architecture according to examples may also provide the transaction management apparatus interaction with the provider apparatus to exploit information held by the provider apparatus to facilitate tasks such as obtaining customer consent, establishing transaction eligibility, and transferring funds held in accounts under the management and/or control of the provider apparatus, such as funds used in payment for precious metals transactions.

The system architecture may use a number of secure protocols to facilitate interaction between the user, the transaction management apparatus, and the provider apparatus to improve the user's experience in a number of ways. The technology may also help avoid other problems, such as the possibility of money laundering and/or fraud. Money laundering is a particularly large concern for precious metals transactions, in that precious metals such as gold, silver, and so on, are physical objects that have an intrinsic value and once they are purchased, can be used to fund illegal activities without the controls that may be placed on electronic transactions or standard currency, due to the ability to freely redistribute the precious metals once a user has physical possession of the precious metals.

Initially, the user logs in and establishes and authenticates his or her identity with the financial institution, through a client device. For example, the user may use a mobile app, a dedicated PC application, or a banking site. A financial institution may host a separate site specifically dedicated to a particular type of financial transactions, such as precious metals transactions, such as by using the transaction management apparatus. Once the user has identified himself or herself and authenticated his or her identity for the financial institution successfully, the user may then interact with the transaction management apparatus, which provides an interface that is specifically focused on providing the customer the capability to purchase precious metals appropriately.

In one or more examples, the user's experience may be enhanced in a number of ways. For example, once the provider authenticates the user, because the user is known or trusted, it may become an acceptable risk to increase the user's spending limit when the user would like to buy a large quantity of precious metals. Additionally, once the provider authenticates the user, because the system has access to additional information held by the financial institution, information may be gathered from the financial institution to provide statements and additional information that provide the user with additional information about how precious metals transactions affect their other accounts and provide detailed statements that provide enhanced information about other information associated with transactions.

Figure 3:
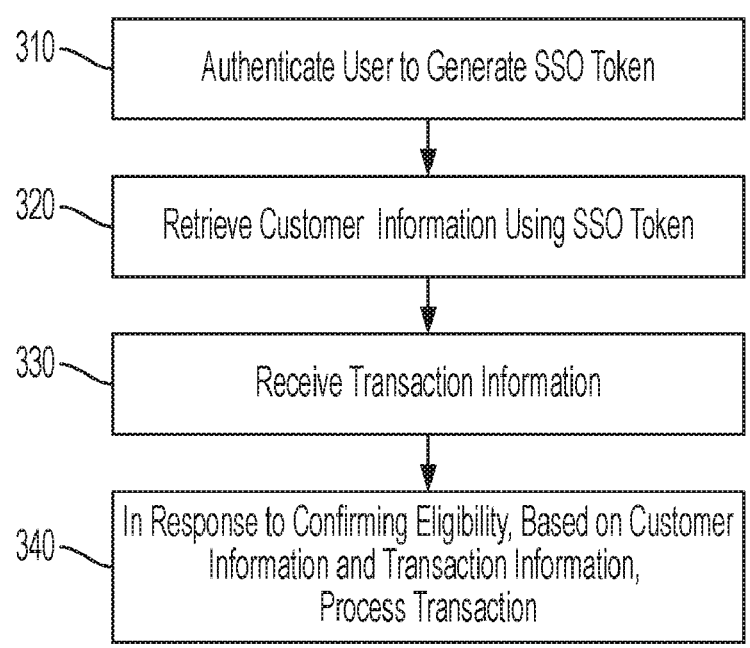
FIG. 3 is a flowchart illustrating a method authenticating a user and allowing the user to perform a transaction in a system, according to one or more embodiments.

FIG. 3 is a flowchart illustrating a method authenticating a user and allowing the user to perform a transaction in a system according to one or more embodiments.

In the example of FIG. 3, in operation 310, user 110 uses client device 102 to authenticate his or her identity, over the network 104, with transaction management apparatus 106, such as though main provider platform 180, thereby generating an SSO token at the main provider platform 180. Thus, authentication provides the transaction management apparatus 106 with the ability to obtain information and otherwise interact with the provider apparatus 108 on behalf of the user 110, obtaining information and initiating transactions for the user, such as in support of precious metals transactions. Such an SSO token may also be referred to as a "Valet Key" or "Valet Ticket," and may be associated with a Valet Ticket ID. The SSO token provides a single sign-on process to identify and authenticate a user of transaction management apparatus 106. Once such an authentication has occurred, the SSO token acts to provide information to transaction management apparatus 106 that transaction management apparatus 106 may use to gain access to provider apparatus 108. The SSO token may include information about the user's identity, the user's access privileges, and authenticating information establishing such identity and access privilege information.

SSO involves the client device 102 by creating a SAML assertion identifying the user 110, and including a signature so the SAML cannot be tampered with or changed. Then, that SAML is sent into a web browser redirect to the destination site.

In one or more examples, because a transaction store, such as for precious metals, is hosted externally at the transaction management apparatus 106, the process puts the SAML assertion into a Valet Service, which stores the SAML for us, and returns a Valet Key. The client device 102 then puts the Valet Key into the web browser redirect to the destination site, the transaction management apparatus 106. This approach may help ensure that if the browser request is intercepted online, or in the middle, the attacker would only have a Valet Key, which would not be useful or identifiable. Only the provider site with access to the Valet API can retrieve it. The Valet Service storage may be short-lived, such as 60 seconds, as a non-limiting example, and cannot be accessed more than once. Once a Valet Key has been used, it and its contents may be deleted.

Operation 310 can occur in a variety of ways. The management apparatus 106 may use a content delivery provider 150, such as a portal provided by AKAMAI to implement operation 310. In one or more examples, discussed in greater detail below, the SSO token is validated in conjunction with SAML, a CSSP, and a Valet API. In yet another approach, the user may login and be authenticated by using a social network such as FACEBOOK, such that FACEBOOK, as a non-limiting example, provides an SSO token for access authorization. However, these are only non-limiting examples, and the SSO token may be generated in other ways in other examples that provide an authenticated SSO token that securely identifies the user 110 and determines the access privileges allocated to the user 110.

In operation 320, the transaction management apparatus 106 retrieves customer information using the SSO token. As discussed above, the SSO token identifies the user and establishes a way to access related information at the provider apparatus. For example, the customer information may be derived as a portion of a customer information file (CIF) associated with the user 110. Because the SSO token identifies the user 110, the SSO token may be used in operation 320 to access the provider data repository 120 as a source of customer information.

In operation 330, the transaction management apparatus 106 may receive transaction information from the user 110 via the network 104 from client device 102. For example, the client device 102 may provide access to the transaction management apparatus 106, such as by an application, the web browser 102A, or the mobile app 102B, and may interact with the user 110 via the network 104 from client device 102, to establish which products the user 110 would like to purchase, ascertain how much payment is necessary, and what the source of the payment is.

In operation 340, the transaction management apparatus 106 uses the transaction information in combination with the customer information to establish that the purchase is an eligible purchase. Once it has been established that the purchase is an eligible purchase, the transaction management apparatus 106 takes action to instruct the provider apparatus 108 to authorize payment and/or to provide the purchased item or items to the user. Such payment authorization and provision of purchased items are discussed in greater detail, below.

Figure 4A:
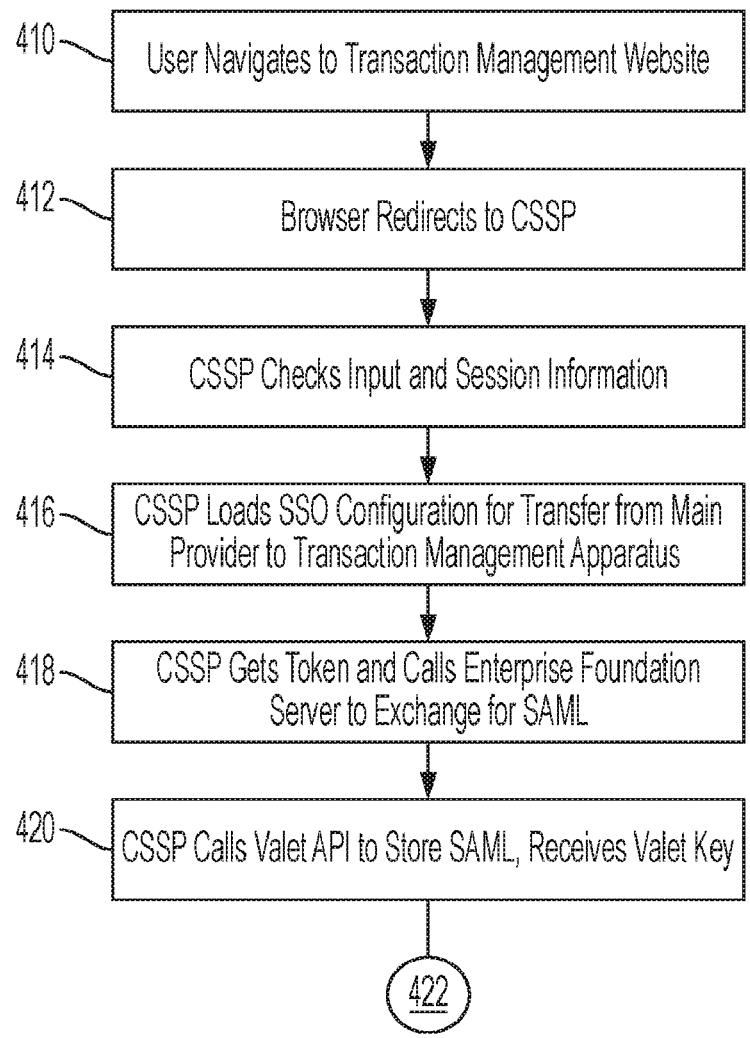
FIGS. 4A-4B are flowcharts illustrating a method authenticating a user to generate an SSO token, according to one or more embodiments.
Figure 4B:
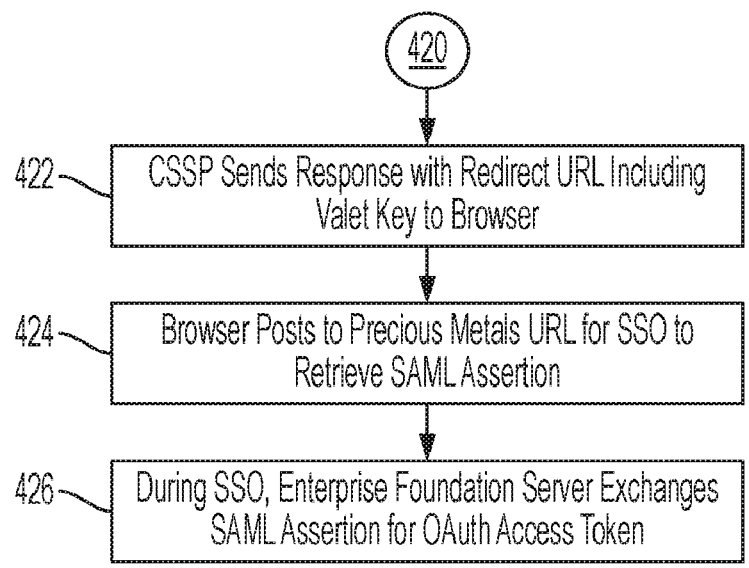

FIGS. 4A-4B are flowcharts illustrating a method authenticating a user to generate an SSO token, according to one or more embodiments.

In operation 410, user 110 may take an action to navigate to the Precious Metals store at client device 102. For example, the user 110 may click a link in the financial institution's site using the web browser 102A, or may activate a control, such as a button, in the mobile app 102B, indicating that the user 110 would like to access the Precious Metals store. Thus, such an initial interaction may be from the main provider platform 180.

In operation 412, the financial institution's site or the mobile app may redirect the user to a Customer Single Sign-on Provider (CSSP), passing parameters identifying the destination as the Precious Metals site. The CSSP may be hosted by the provider apparatus 108, or may be a separate entity.

In operation 414, the CSSP may check the received information for validity. For example, the input information may be the user's session information, which may be a Session ID in the browser's session cookies. Other, related information may be passed to the CSSP if the login attempt occurs through a mobile app instead of through a financial institution's main site.

In operation 416, the CSSP loads the SSO configuration used for enabling a transition from accessing the main provider platform 180 for a financial institution to a site for Precious Metals, hosted by transaction management apparatus 106.

In operation 418, the CSSP gets the user access token, such as from the server-side cache, and may call an enterprise federation server that enables user authentication and single sign-on to exchange it for an SAML Assertion. For example, a suitable platform for this operation is PINGFEDERATE.

In operation 420, the CSSP then calls the Valet API to store the SAML assertion, and gets back a Valet Key.

In operation 422, the CSSP then sends a response to the user's browser—a FORM with a redirect URL, which includes the Valet Key in the form input parameters.

In operation 424, the browser 102A may POST to a specific Precious Metals URI, which then handles the SSO intake process. For example the, POST includes information that indicates the transaction management apparatus 106 should have certain types of access to the provider apparatus 108.

In operation 426, during SSO, an enterprise foundation server exchanges the SAML assertion for an OAuth Access Token, which can subsequently be used to provide and facilitate user 110 access.

During authentication, the SAML assertion is stored in the Valet Key, for example.

During SSO, the transaction management apparatus 106 may receive the Valet Key by itself, for example. The transaction management apparatus 106 may also call the Valet API at the provider apparatus 108 to retrieve the authorization information, which is the SAML assertion.

The transaction management apparatus 106 also calls an identity provider, such as an enterprise foundation server such as Customer PINGFEDERATE, in a non-limiting example, to exchange the SAML for an access token, passing along the standard input parameters as required by the identity provider.

When the transaction management apparatus 106 receives back a valid customer access token, the transaction management apparatus 106 may then trust the authorization process was correct, was not tampered with, and cannot be repeated.

The transaction management apparatus 106 may use the OAuth access token to call an API provided by the provider apparatus 108, and may use the customer identity within the OAuth token to call the provider apparatus 108's own backend databases, such as provider data repository 120.

Figure 4C:
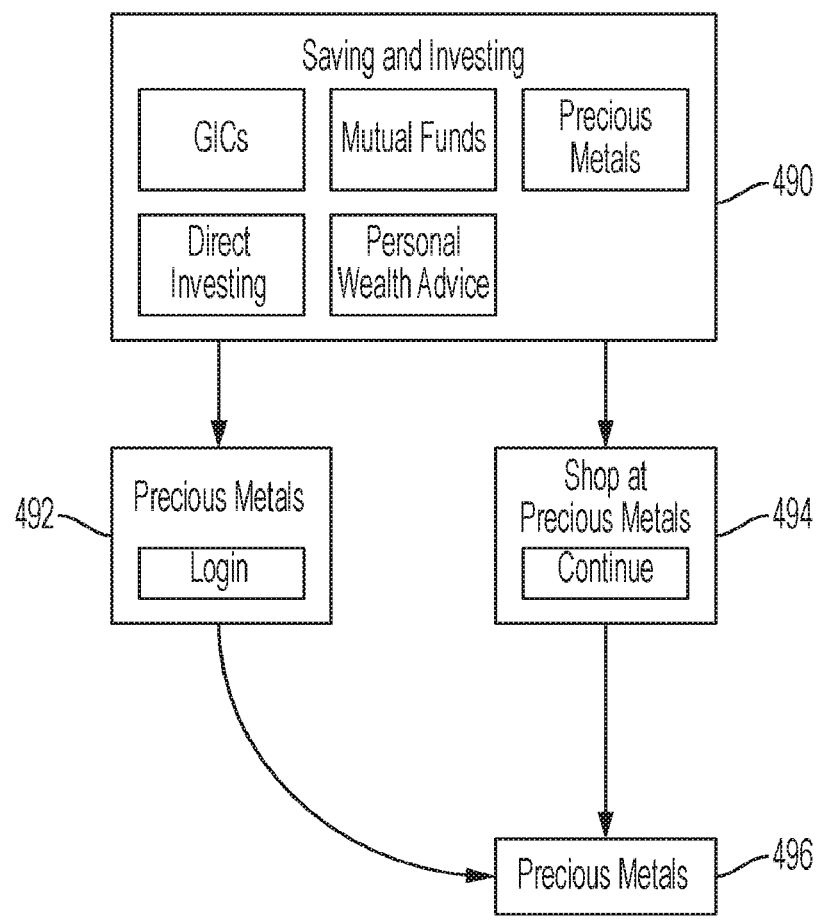
FIG. 4C is a set of screenshots showing facilitation of an SSO process by a transaction management apparatus, from a user's perspective, according to one or more embodiments.

FIG. 4C is a set of screenshots showing facilitation of an SSO process by a transaction management apparatus, from a user's perspective, according to one or more embodiments.

Window 490 shows an interface at a financial institution's site for various saving and investment options, such as Guaranteed Investment Certificates (GICs), Mutual Funds, Precious Metals, Direct Investing, and Personal Wealth Advice. Such a window 490 may be a web page associated with main provider platform 180.

According to one or more examples, in window 490 of the client device 102, the user 110 may select Precious Metals as an option. In a typical system, as illustrated in window 492, the user 110 next sees a Precious Metals site, but the user 110 is required to perform a separate login for Precious Metals.

In a system according to one or more examples, as illustrated in window 494, which may be an optional transitional window, the system according to the example notifies the user 110 that the user 110 is automatically being logged into the Precious Metals site. In window 496, the Precious Metals site hosted by transaction management apparatus 106 is presented to the user 110. Window 496 may be accessed by a successful login from window 492 or window 494. However, when the direct login occurs, such that the user 110 is automatically authorized as discussed above, the user 110 may have greater access privileges because the login directly into the transaction management apparatus 106 only provides limited user information with respect to all of the information that would be available if the transaction management apparatus 106 has access to the provider apparatus 108.

Figure 5:
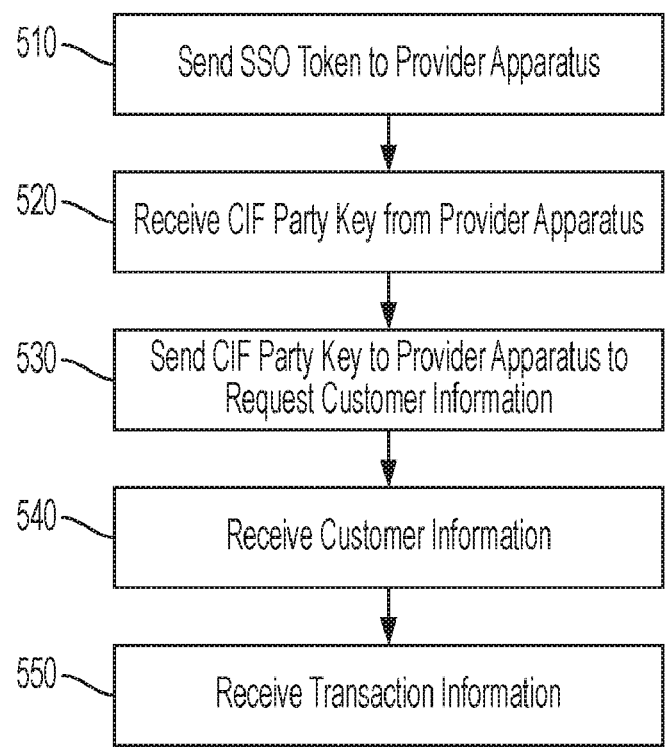
FIG. 5 is a flowchart illustrating a method gathering information for a transaction, according to one or more embodiments.

FIG. 5 is a flowchart illustrating a method for gathering information for a transaction, according to one or more embodiments.

A customer information file (CIF) is an electronic file that stores pertinent information about a customer's personal and account information, such as for an entity, e.g., a business, that provides goods and/or services to the customer. The customer information file (CIF), which may contain a CIF number, alphanumerical identifier, or other identifier, provides the entity the capability to view its customer accounts in various ways and gain access to information that is useful to the transaction management apparatus 106. A CIF, e.g., traditionally in the banking industry, might include a client's credit relationships, accounts owned, and ownership information.

The CIF for a bank institution may record such information as a customer's vital statistics account balances and transactions, and types of accounts held. It is updated as often as daily to ensure accuracy and may be used to assist in various service and administrative functions within the banking institution.

A CIF may provide the entity with a summary of some or all of the activities associated with a particular customer.

A CIF may include some of the various credit products such as loans and credit cards currently in use by a customer. The CIF may also include information regarding any previous inquiries, to help provide targeted information for the purpose of cross-selling, which is offering complementary products to existing clients.

The CIF may also contain personally identifiable information (PII). This information may include the customer's name, address, and phone number for the purposes of fulfilling purchases. A CIF may also include a person's birth date and Social Security number, which is more often required in banking or in circumstances in which credit is relevant. Further information, such as race and gender, may also be included if the information is available. Other information may also be stored in the CIF to improve security, such as security questions and answers and information related to multi-factor authentication, for use in one or more examples. The CIF may be a partial CIF at the discretion of the financial institution, e.g., including only information that is believed to be necessary for a particular transaction, such as a particular order or purchase.

In operation 510, the transaction management apparatus 106 may send the SSO token which it previously received to provider apparatus 108, requesting access to information associated with the user 110, such as the CIF associated with the user 110. As noted above, the SSO token may be an OAuth token. For example, such an OAuth token may be an access token that can be used to gain direct access to services on the behalf of the user 110. For example, the OAuth token may be used in conjunction with a policy language such as XACML to provide an access control architecture, a policy language to specify policies associated with the OAuth token, and a request/response scheme to send and receive authorization requests. Also, the OAuth token may include a ConnectID that provides a way to access information, such as within provider data repository 120 associated with user 110.

In operation 520, the transaction management apparatus 106 may receive a CIF party key from the provider apparatus 108. Because the transaction management apparatus 106 received the SSO token in operation 510, the CIF party key may be a key associated with user 110 that provides the transaction management apparatus 106 the capability to use when requesting the information related to user 110, in that the CIF party key identifies the user 110 and establishes that the transaction management apparatus 106 is to have access to the CIF at the provider apparatus 108.

In operation 530, the transaction management apparatus 106 sends the CIF party key to the provider apparatus 108 to request customer information. Also, the transaction management apparatus 106 may not request the entire CIF, but may instead make an information request from the provider apparatus 108 for specific user information. For example, the transaction management apparatus 106 may not need to know the gender of the user 110, but may need to know if they reside in a particular location where there are laws affecting how precious metal transactions are to be carried out. Such querying can proceed in various ways, and the transaction management apparatus 106 may interact in various ways with provider apparatus 108 to identify which information from the CIF is relevant to a given precious metals transaction.

In operation 540, the transaction management apparatus 106 receives customer information from the provider apparatus 108, in response to the request sent in operation 530.

In operation 550, the transaction management apparatus 106 may receive transaction information from client device 102. Such transaction information may detail the parameters of what is to be purchased. For example, the transaction information may include information such as, in a non-limiting example, identities of a product or products to be purchased, such as a name and/or identifier of the products, a quantity, a unit price for the products, a total price of the products, and so on.

Figure 6:
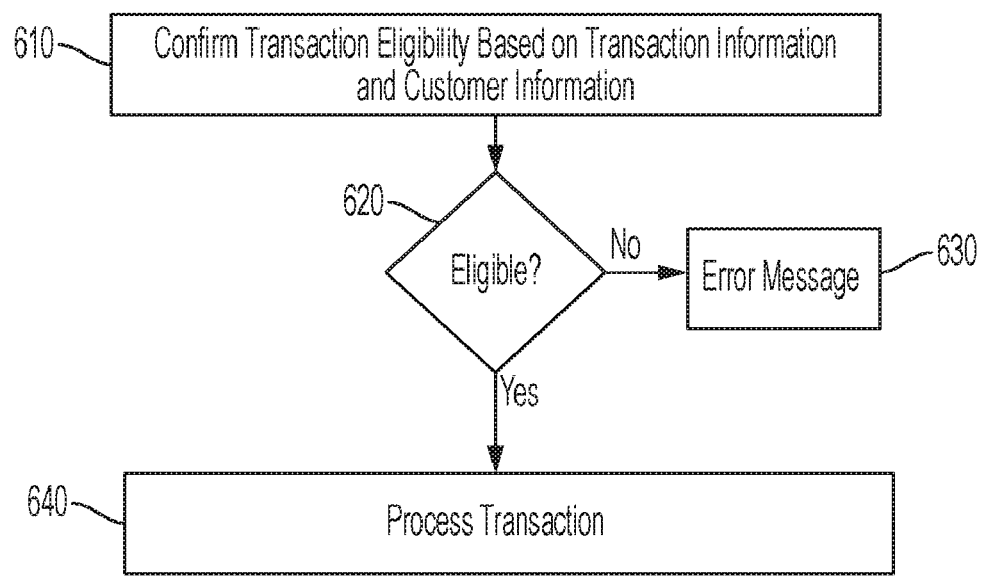
FIG. 6 is a flowchart illustrating a method processing eligibility for a transaction, according to one or more embodiments.

FIG. 6 is a flowchart illustrating a method for processing eligibility for a transaction, according to one or more embodiments.

In operation 610, the transaction management apparatus 106 may perform a check to determine the purchase eligibility based on the transaction information received from the client device 102 in operation 550 and the CIF or subset of the CIF retrieved in operation 540. For example, the transaction management apparatus 106 may ascertain if certain conditions are true that would cause the purchase to be ineligible. For example, the transaction management apparatus 106 may check that the user is legally permitted to purchase products included in the transaction, that the user has sufficient funds to purchase products of the transaction, that the user is located at a suitable location to receive products of the transaction, that the user has consented to suitable terms to receive products of the transaction, that sufficient quantities of product are available to fulfill the products of the transaction, and/or that there is no flag or indicator associated with the user providing that it is not appropriate to fulfill the products of the transaction.

In operation 620, results of the check performed in operation 620 may be used to determine that operation 640 may be performed, when the check indicates eligibility, and that operation 630 may be performed, when the check indicates ineligibility.

Figure 9:
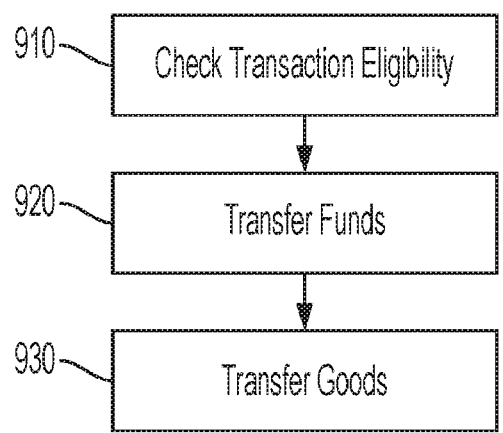
FIG. 9 is a flowchart illustrating example transaction implementations, according to one or more embodiments.

In particular, operation 640 includes processing the purchase, as explained in greater detail in FIG. 9.

In particular, operation 630 includes alerting the user 110 that there is an error in the purchase. For example, the transaction management apparatus 106 may cause the client device 102 to advise the user that the transaction cannot be processed and/or completed. The transaction management apparatus 106 may also cause the client device 102 to explain why the transaction cannot be processed, and may cause the client device 102 to interact with the user to fix the problems in the transactions, so that the eligibility may be reconfirmed and then the transaction is carried out. For example, if the user asks to buy a quantity of gold coins whose total price exceeds the amount of funds available to pay for the transaction, the user may be guided through various ways to resolve this issue, such as reducing the quantity of gold coins being purchased, changing the item being purchased, and changing how the transaction is to be paid for, according to non-limiting examples. The transaction management apparatus 106 may use a variety of techniques to cure errors identified in operation 620 to provide ways to have a transaction be successfully processed in operation 630.

Figure 7:
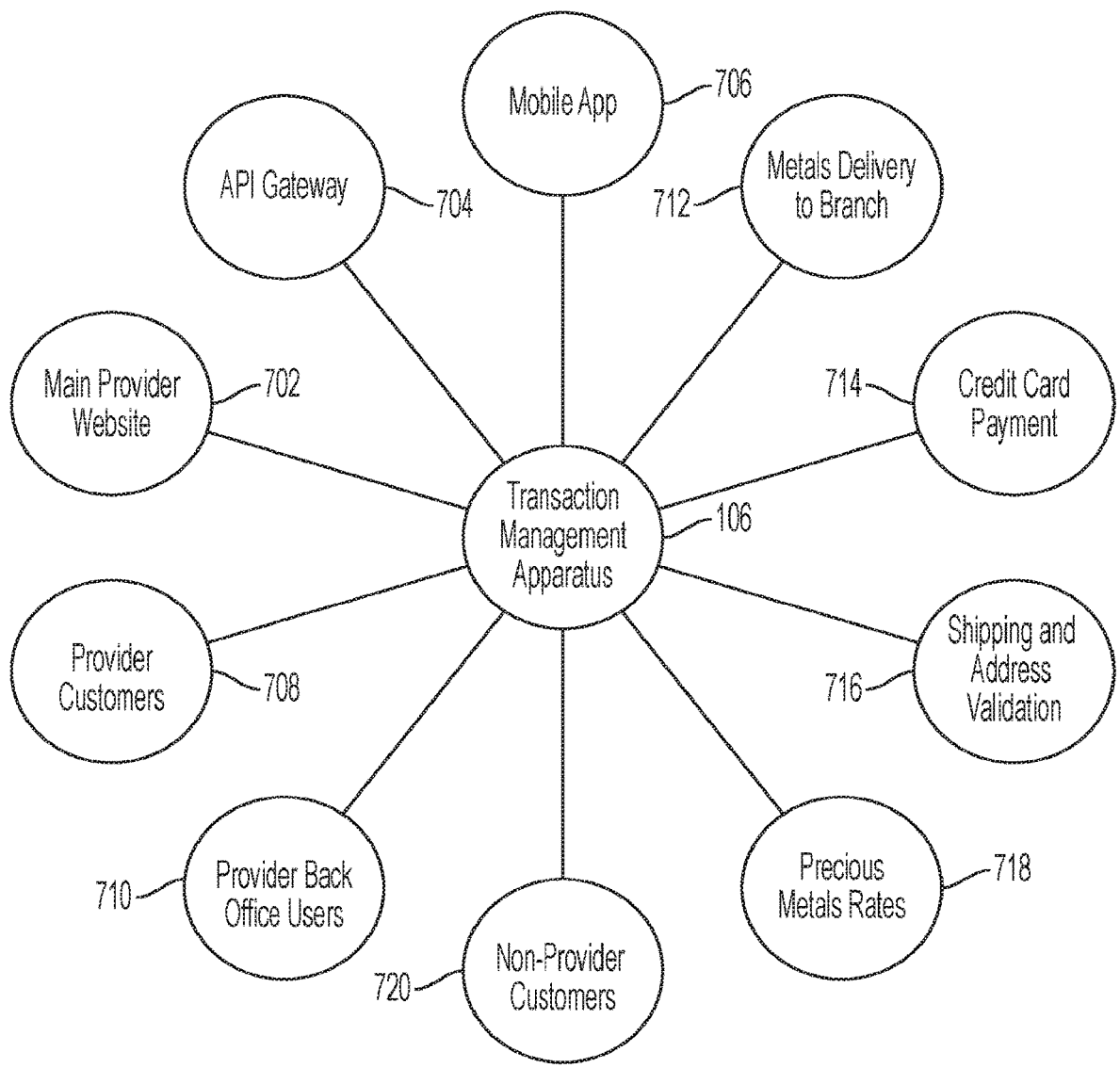
FIG. 7 is a context diagram for a transaction system, according to one or more embodiments.

FIG. 7 is a context diagram illustrating data flow, according to one or more embodiments. In one or more examples, the online precious metals store may be a transaction site.

For example, the transaction site may be a transaction site that provides JAVA-based tools that provide for the creation and management of sophisticated Internet web sites. For example, a financial institution may provide access to a proprietary site for a user 110 through one or more of the main provider site 702 for the financial institution), an API gateway 704 that provides a dedicated application to communicate with the transaction site 700, a mobile app 706 that interacts with the transaction site 700, and alternatively through other protocols for financial institution customers 708 and internal financial institution back office users 710. An example aspect that all or some of these types of entities share is that they have a preexisting trust relationship with the financial institution itself that provides the financial institution the capability to verify and/or authenticate the user 110, and then provide for access to improve secure access to the transaction site and provide the transaction site with additional flexibility.

The transaction site also interacts with third party information sources and parties. For example, the transaction Store provides for actual delivery of the precious metals to branches by using a delivery service 712, such as the GARDAWORLD corporation, which is a private security firm that offers secure delivery of the precious metals to the branch offices where purchasers can receive them. The transaction site 700 also coordinates credit card payments for the precious metals by using a credit card payment service 714, such as BAMBORA, which is a Swedish provider of credit card transaction processing services. The transaction site 700 may also interact with a shipping and address validation service 716, such as CANADA POST to coordinate shipping tasks, as well as using information supplied by CANADA POST to perform address validation. The transaction site 700 also interacts with a precious metals rates service 718, such as THOMPSON REUTERS to access precious metals rates information. Finally, the transaction site 700 is able to provide limited transaction access for non-financial institution customers 720, but because the financial institution does not have information for these customers, but it may still be appropriate to provide non-financial institution customers 720 the capability to perform some transactions. However, it is to be noted that because non-financial institution customers 720 may not be authenticated in the same manner as financial institution customers 708, there may be limitations on what non-financial institution customers 720 are allowed to do. For example, non-financial institution customers 720 may be restricted to credit card payments, there may be caps on how much the non-financial institution customers 720 are allowed to spend, which products the non-financial institution customers 720 are allowed to purchase, where the products may be delivered, and so on, as non-limiting examples, and there may be other limitations placed on non-financial institution customers 720, in other examples, and these enumerated limitations are not enforced in all examples.

Figure 8:
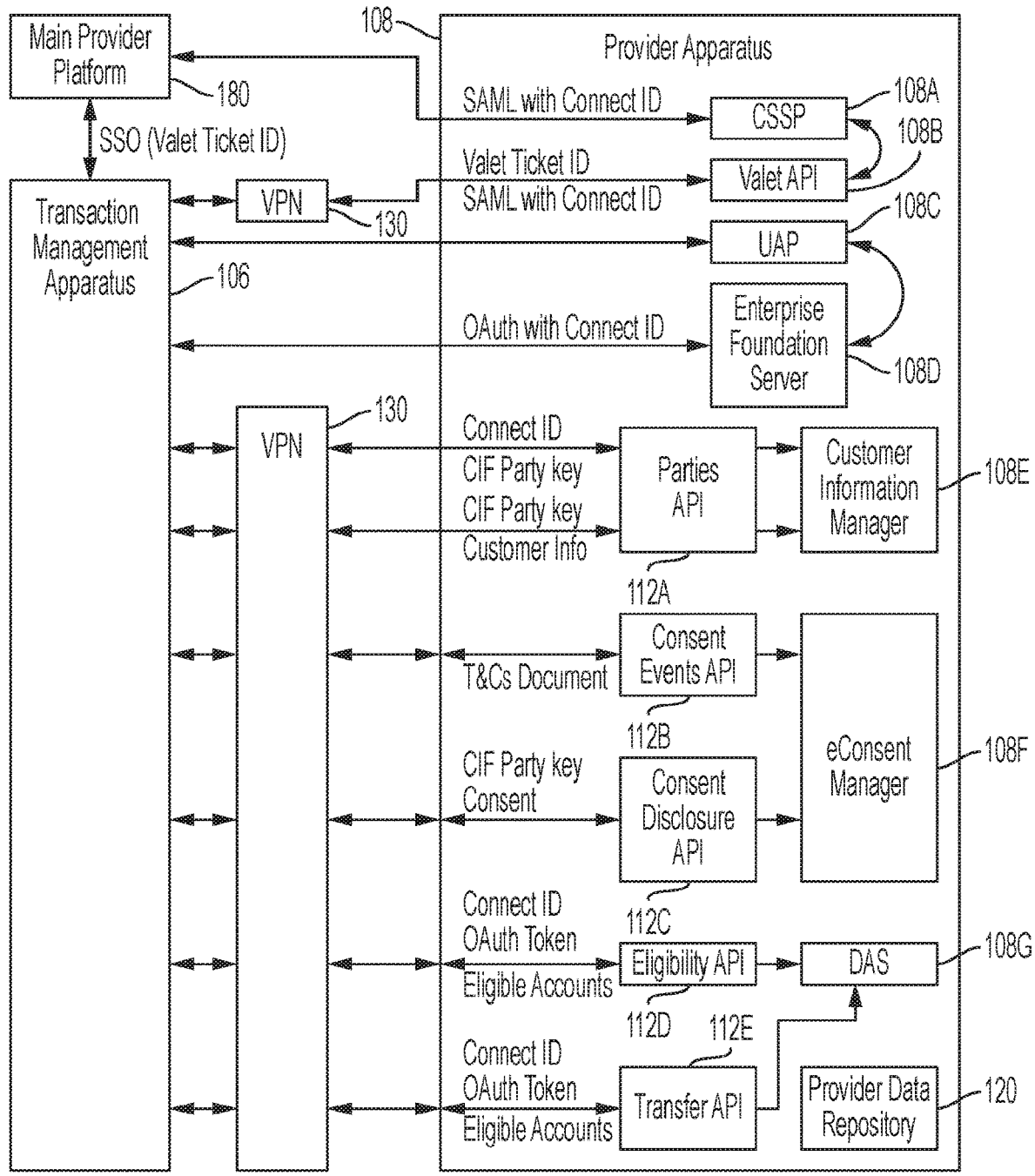
FIG. 8 is a diagram illustrating specific interactions between elements included in a transaction system, according to one or more embodiments.

FIG. 8 is a diagram illustrating specific interactions between elements included in a transaction system, according to one or more embodiments.

FIG. 8 illustrates an example system related to that of FIG. 2, where some aspects have merely not been illustrated in order to facilitate illustrating interactions between the relevant portions of FIG. 8.

An approach, as shown in the example of FIG. 8, is to use a main provider platform 180, such as a provider site or a mobile app, as non-limiting examples, which establishes, as an SSO for the user, a Valet Ticket ID. A number of other typical authentication processes may also be used here, though some authentication processes, such as FACEBOOK, may only provide partial access privileges.

For example, when initially navigating from the main provider platform 180, such as a financial institution's site, whether on a PC or mobile web browser, or through a mobile app or another dedicated application, into the transaction site, such as for the purchase of precious metals, the authentication and/or authorization may occur as illustrated in FIGS. 4A-4C. By way of further explanation, the SSO process is also discussed in conjunction with FIG. 8.

As noted above, the authorization is initiated when the user 110 performs an action at the client device 102 instructing main provider platform 180 to navigate to the transaction management apparatus 106 hosting the transaction site. FIG. 8 illustrates the data interactions between main provider platform 180, transaction management apparatus 106, provider apparatus 108, and VPN 130. Provider apparatus 108 also includes a customer single-sign on provider (CSSP) 108A, valet API 108B, unified authenticating platform (UAP) 108C, enterprise foundation server 108D, customer information manager 108E, eConsent Manager 108F, and direct-access storage (DAS) 108G. When interacting with CSSP 108A, valet API 108B, UAP 108C, enterprise foundation server 108D, customer information manager 108E, eConsent Manager 108F, and direct-access storage (DAS) 108G, VPN 130 may be provided as an intermediary element between transaction management apparatus 106 and these elements of provider apparatus 108.

As a result of this initiating action, the main provider platform 180 provides a Valet Ticket ID for use in an SSO process.

For example, the main provider platform 180 may interact with the CSSP 108A, and the valet API 1088 may interact with transaction management apparatus 106. Additionally, transaction management apparatus 106 may interact with UAP 108C and enterprise foundation server 108D to initially establish the SSO and provide a token to the user for use in access information.

For example, main provider platform 180 may send an SAML assertion with a ConnectID to CSSP 108A. CSSP 108A may interact with Valet API 108B, and main provider platform 180 may also send a Valet Ticket generated with an Enterprise Valet Service, which takes the SAML and returns a Valet Key associated with a Valet Ticket ID. The transaction management apparatus 106 may send the Valet Ticket ID to the Valet API 108B, and return the SAML assertion for use in authenticating the user.

Once the transaction management apparatus 106 has the SAML assertion, it interacts with UAP 108C and Enterprise Foundation Server 108D that provide an access token, such as an OAuth token with a ConnectID. As discussed above, through the use of the Valet Key, it becomes possible get the OAuth token without exposing user credentials unnecessarily.

As part of the authentication pathway, the Transaction Store may use a VPN to pass the Valet Ticket ID to the Valet API, which then responds with the SAML assertion with the ConnectID that can be used for final authentication.

Once the user is identified and the transaction management apparatus 106 has access to an access token, such as an OAuth token including the ConnectID, new ways of utilizing that identity by transaction management apparatus 106 to interact with the provider apparatus 108 are available and exploited.

For example, transaction management apparatus 106 may communicate with customer information manager 108E, such as through VPN 130 and Parties API 112A. Here, the transaction management apparatus 106 sends a ConnectID and receives a CIF Party Key, then sends the CIF Party Key and receives Customer information in return. Access to such a CIF party key provides many kinds of information stored by the financial institution at the customer information manager that can be used to improve the user's experience over previous approaches. For example, the transaction management apparatus 106 supplies information discussed above, with customer information such as identifying information and account information that may be used to verify transaction eligibility, to pay for a transaction once eligibility has been established, and to facilitate delivery of the purchased goods, after they are paid for. However, this ordering is only a non-limiting example, and delivery of the purchased goods may be carried out prior to their being paid for, in another example.

Also, transaction management apparatus 106 may communicate with eConsent manager 108F, such as through VPN 130 and Consent Events API 112B and Consent Disclosure API 112C. Consent Events API 112B facilitates exchange of terms and conditions documents (T & Cs Document), and Consent Disclosure API 112C facilitates the receipt of a CIF Party Key and a Consent document.

Such a CIF Party Key may then be used in tandem with a consent module, which may be hosted by the provider apparatus 108 or may be hosted separately that provides use of a consent events/disclosure APIs that can provide eConsent and send terms and conditions documents tailored to a particular user's circumstances. In one or more examples, the eConsent may be a one-time consent process, in which the user 110 consents to conditions for performing precious metals transactions. For example, the user 110 may agree to assume responsibility for various risks, such as if there is a delivery problem, as a non-limiting example. As noted, this eConsent may be a one-time consent, but it is also possible to perform the eConsent each time the user 110 performs a transaction, or have the user 110 use a control such as a checkbox or another GUI control at client device 102 to indicate whether the user 110 would like to perform a separate eConsent step for each transaction, or desires to skip eConsent subsequently, and assume that there is consent. In another example, the user 110 may opt to perform an eConsent process only if certain conditions are fulfilled, such as by only performing an eConsent process for transactions greater than a certain amount. For example, an eConsent process may involve electronically agreeing to certain with an e-signature, and/or verifying certain credentials to confirm and/or establish that the user 110 performing the eConsent is actually the user 110 that the provider apparatus 108 believes to be performing the transaction.

The transaction management apparatus 106 may then interact with provider apparatus 108 to use a Direct-Attached Storage (DAS) 108G that stores information for provider apparatus 108, which may be implemented as provider data repository 120, to store information to establish eligibility and perform the necessary transactions to purchase the precious metals under consideration. However, a DAS 108G is only a non-limiting example of how the provider apparatus 108 may store information, and in other examples, the provider apparatus 108 uses other storage approaches. Importantly, other accounts may be used for payment, and payment is not limited to a credit card. The ability to track transactions also provides for higher transaction limits and may help avoid concerns about money laundering.

For example, transaction management apparatus 106 may communicate with DAS 108G, such as through VPN 130 and Eligibility API 112D and Transfer API 112E. Eligibility API 112D may receive the ConnectID in the OAuth Token, and may return information about eligible accounts. Transfer API 112E may also receive the ConnectID in the OAuth Token, and may return a transfer money response.

FIG. 9 is a flowchart illustrating ways of implementing transactions, according to one or more embodiments.

In operation 910, the transaction management apparatus 106 checks that the user's transaction is eligible. As discussed above, such a check may be performed at operation 610.

In operation 920, the transaction management apparatus 106 sends a request to provider apparatus 108 to transfer funds to pay for the goods. For example, such a funds transfer may occur by using transfer API 112E in conjunction with DAS 108G to authorize a funds transfer.

In operation 930, the transaction management apparatus 106 enacts delivery of the goods, such as precious metals, to the user. For example, a variety of delivery services and/or in person pickup may facilitate delivery of the goods.

The system architecture 100, client device 102, AKAMAI application 102A, web browser 102B, mobile app 102C, network 104, transaction management apparatus 106, provider apparatus 108, CSSP 108A, Valet API 108B, UAP 108C, enterprise foundation server 108D, customer information manager 108E, eConsent manager 108F, DAS 108G, parties API 112A, consent events API 112B, consent disclosure API 112C, eligibility API 112D, transfer API 112E, provider data repository 120, VPN 130, content delivery platform 150, third-party providers 170, and main provider platform 180 in FIGS. 1-9 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one or more examples, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one or more examples, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one or more examples, the instructions or software and any associated data, data files, and data structures are distributed over network-coupled computer systems so that the instructions and software and any associated data, data files, and data structures are stored, accessed, and executed in a distributed fashion by the one or more processors or computers.

The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

Although the subject matter has been described in terms of example embodiments, it is not limited thereto. Rather, the appended claims should be construed broadly, to include other variants and embodiments, which may be made by those skilled in the art.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus, comprising:
a communications interface;
a memory storing instructions; and
at least one processor coupled to the communications interface and the memory, the at least one processor being configured to execute the instructions to:
  transmit, via the communications interface, a digital token to a computing system, the computing system maintaining user information, the digital token being associated with a device operable by a user, and the digital token being indicative of a prior authorization of the apparatus to access a subset of the user information maintained by the computing system;
  request and receive, via the communications interface, the subset of the user information based on the transmitted digital token; and
  perform operations that execute an exchange of data initiated by the device based on a determined consistency between the subset of the user information and one or more execution conditions associated with data exchange.

2. The apparatus of claim 1, wherein the at least one processor is further configured to execute the instructions to receive the digital token from the computing system.

3. The apparatus of claim 1, wherein the at least one processor is further configured to execute the instructions to:
receive key data from the computing system via the communications interface, the key data being associated with the device and identifying of one or more elements of the user information that are accessible to the apparatus, the computing system being configured to generate the key data based on a validation of the digital token; and
transmit the key data to the computing system via the communications interface, the computing system being configured to access one or more elements of the user information based on the key data; and
receive, via the communications interface, the one or more elements of the user information from the computing system.

4. The apparatus of claim 1, wherein the at least one processor is further configured to execute the instructions to:
determine that the subset of the user information is consistent with the one or more execution conditions;
establish that the device is eligible to execute the data exchange based on the determined consistency between the subset of the user information and the one or more execution conditions; and
based on the established eligibility of the device, perform the operations that execute the data exchange.

5. The apparatus of claim 1, wherein the at least one processor is further configured to execute the instructions to:
receive, via the communications interface, information characterizing the data exchange from the device, the information comprising a value of one or more parameters of the data exchange; and
based on the determined consistency between the subset of the user information and the one or more execution conditions, perform the operations that execute the data exchange in accordance with the one or more parameter values.

6. The apparatus of claim 5, wherein the at least one processor is further configured to execute the instructions to, based on the determined consistency between the subset of the user information and the one or more execution conditions, and between the information characterizing the data exchange and with the one or more execution conditions, perform the operations that execute the data exchange in accordance with the one or more parameter values.

7. The apparatus of claim 1, wherein the at least one processor is further configured to:
execute the instructions to transmit, via the communications interface, a request to execute the data exchange to the computing system, the request comprising a value of one or more parameters of the data exchange; and
the computing system is configured to execute the data exchange in accordance with the one or more parameter values.

8. The apparatus of claim 1, wherein the digital token comprises a single sign-on (SSO) token, the SSO token being generated by the computing system based on a prior authentication of the device.

9. The apparatus of claim 1, wherein the digital token comprises an OAuth token, the OAuth token being generated by the computing system based on a prior authentication of the device.

10. A computer-implemented method, comprising:
transmitting a digital token to a computing system using at least one processor, the computing system maintaining user information, the digital token being associated with a device operable by a user, and the digital token being indicative of a prior authorization to access a subset of the user information maintained by the computing system;
using the at least one processor, requesting and receiving the subset of the user information based on the transmitted digital token; and
performing operations, using the at least one processor, that execute an exchange of data initiated by the device based on a determined consistency between the subset of the user information and one or more execution conditions associated with data exchange.

11. An apparatus, comprising:
a communications interface;
a memory storing instructions and elements of user information; and
at least one processor coupled to the communications interface and the memory, the at least one processor being configured to execute the instructions to:
receive, via the communications interface, one or more login credentials associated with a device operable by a user;
based on a validation of the one or more login credentials, perform operations that authorize a computing system to access a subset of the elements of user information maintained at the apparatus and that generate a digital token indicative of the authorized access;
transmit the digital token to the computing system via the communications interface, the computing system being configured to request and receive the subset of the elements of user information based on the digital token and to perform operations that execute an exchange of data initiated by the device based on a determined consistency between the subset of the elements of user information and one or more execution conditions associated with data exchange.

12. The apparatus of claim 11, wherein the at least one processor is further configured to execute the instructions to receive, via the communications interface, the one or more login credentials from at least one of the computing system or the device.

13. The apparatus of claim 11, wherein the at least one processor is further configured to execute the instructions to:
receive the digital token from the computing system via the communications interface;
obtain the one or more elements of user information from the memory based on a validation of the digital token; and
transmit the one or more elements of user information to the computing system via the communications interface.

14. The apparatus of claim 13, wherein:
the digital token indicates the authorization of the computing system to access the subset of the elements of user information; and
the at least one processor is further configured to execute the instructions to:
obtain the subset of the elements of user information from the memory; and
transmit the subset of the elements of user information to the computing system via the communications interface.

15. The apparatus of claim 11, wherein the at least one processor is further configured to execute the instructions to:
receive the digital token from the computing system via the communications interface;
based on a validation of the digital token, generate key data identifying the subset of the elements of user information accessible to the computing system; and
store the key data within a portion of the memory, and transmit the key data to the computing system via the communications interface.

16. The apparatus of claim 15, wherein the at least one processor is further configured to:
receive the key data from the computing system via the communications interface;
validate the key data, and determine that the subset of the elements of user information are accessible to the computing system based on the validated key data; and
obtain the subset of the elements of user information from the memory and transmit the subset of the elements of user information to the computing system via the communications interface.

17. The apparatus of claim 11, wherein the at least one processor is further configured to execute the instructions to:
receive, via the communications interface, a request to execute the data exchange from the computing system, the request comprising a value of one or more parameters of the data exchange; and
based on the request, perform operations that execute the data exchange in accordance with the one or more parameter values.

18. The apparatus of claim 11, wherein the digital token comprises a single sign-on (SSO) token.

19. The apparatus of claim 11, wherein the digital token comprises an OAuth token.

* * * * *